United States Patent [19]

Wichers et al.

[11] Patent Number: 5,294,370
[45] Date of Patent: Mar. 15, 1994

[54] SELENIUM OR TELLURIUM ELEMENTAL HYDROSOLS AND THEIR PREPARATION

[75] Inventors: Jan H. Wichers, Wageningen; Wilhelmus M. J. van Gelder, Zetten; Albert W. J. van Doorn, Arnhem, all of Netherlands

[73] Assignees: HBT Holland Biotechnology B.V., Leiden; Agrotechnologisch Onderzoekinstituut (ATO), Wageningen, both of Netherlands

[21] Appl. No.: 837,690

[22] Filed: Feb. 19, 1992

Related U.S. Application Data

[63] Continuation of Ser. No. 436,917, Nov. 15, 1989, abandoned.

[30] Foreign Application Priority Data

Nov. 15, 1988 [AU] Australia .............................. 25180/88

[51] Int. Cl.$^5$ .................... B01J 13/00; G01N 33/543
[52] U.S. Cl. ................................... 252/313.1; 423/510; 436/523
[58] Field of Search .............. 252/313.1; 423/508, 423/509, 510; 75/72.1; 436/523, 525

[56] References Cited

U.S. PATENT DOCUMENTS

| | | | |
|---|---|---|---|
| 3,540,859 | 11/1970 | Taylor et al. | 423/508 |
| 3,993,799 | 11/1976 | Feldstein | 106/1.11 X |
| 4,048,354 | 9/1977 | Feldstein | 252/313.1 X |
| 4,122,030 | 10/1978 | Smith et al. | 252/313.1 |
| 4,147,530 | 4/1979 | Langer, Jr. et al. | 75/721 |
| 4,224,178 | 9/1980 | Feldstein | 252/313.1 X |
| 4,259,114 | 3/1981 | Berke et al. | 252/313.1 X |
| 4,613,468 | 9/1986 | Sandman et al. | 423/509 X |
| 4,701,218 | 10/1987 | Barker et al. | 252/313.1 X |
| 4,944,985 | 7/1990 | Alexander et al. | 428/570 |

FOREIGN PATENT DOCUMENTS

| | | |
|---|---|---|
| 0007654 | 2/1980 | European Pat. Off. |
| 0298368 | 1/1989 | European Pat. Off. |
| 0321008 | 6/1989 | European Pat. Off. |
| 60-155506 | 8/1985 | Japan .................... 423/509 |
| 8702769 | 11/1987 | Netherlands |

OTHER PUBLICATIONS

Chemical Abstracts, vol. 111, 190767m.

Primary Examiner—Robert L. Stoll
Assistant Examiner—Daniel S. Metzmaier
Attorney, Agent, or Firm—Cooper & Dunham

[57] ABSTRACT

The invention relates to a process for the preparation of a sol of a metallic or a non-metallic element, such as selenium, tellurium, gold and silver, wherein said process comprises the reduction of a chemical compound, which contains said element in a reducible state, with a borane compound, such as an alkali metal borohydride or an amine borane, as the reducing agent.

9 Claims, No Drawings

SELENIUM OR TELLURIUM ELEMENTAL HYDROSOLS AND THEIR PREPARATION

This is a continuation of application Ser. No. 436,917, filed Nov. 15, 1989 now abandoned.

The invention relates to a process for the preparation of a sol of a metallic or a non-metallic element, comprising the step of treating a solution of a chemical compound, which contains said element in a reducible state, with a reducing agent.

Such a process is known both from very old and from very recent publications. More than hundred years ago, Schulze, J. Pract. Chem. (2), 32, 390, 1885, described a preparation of selenium sols (i.e. dispersions of selenium particles in an aqueous liquid; the sols may also be referred to as hydrosols) by adding $SO_2$ to an aqueous solution of selenious acid ($H_2SeO_3$). The sols thereby obtained are quite turbid, however, and can only be stored for a very short time. In 1902, Gutbier, Z. Anorg. Chemie 32, 52, 1902, described a preparation of tellurium sols by treating an aqueous solution of telluric acid ($H_6TeO_6$) with hydrazine hydrate. The black-colored sol thereby obtained is turbid and unstable, however. Gutbier, Z. Anorg. Chemie 32, 106, 1902, also described a preparation of selenium sols by using hydrazine hydrate as reducing agent. Brintzinger, Koll. Zeitschr. 78, 22, 1937, disclosed a process for the preparation of selenium, tellurium, gold, palladium, platinum, silver, molybdenum and tungsten sols by reduction (for example of $SeO_2$) with ascorbic acid or isoascorbic acid as a reducing agent. He obtained a slightly turbid red-colored selenium sol, a turbid yellowish-white silver sol, etc. A number of different reducing agents, such as formaldehyde, etheric solution of phosphorus, and hydroxylamine have also been proposed. Although some sols were more stable than others, most of the sols obtained were turbid and had a limited stability.

More recent publications on the preparation of sols are, for example, EP-A-0 007 654 (Akzo N. V., published Feb. 6, 1980) which describes the preparation of gold and silver sols from aqueous chloroauric acid ($HAuCl_4$) and silver nitrate ($AgNO_3$) solutions, respectively, by treatment with tri-sodium citrate as reducing agent. In general, the old methods for preparing elemental sols are still used, as appears from EP-A-0 298 368 (Abbott Laboratories, published Jan. 11, 1989) which uses the old process of treating an aqueous $SeO_2$ solution with ascorbic acid for the preparation of a selenium sol. The same applies to Dutch patent application NL-A-87.02769 and the corresponding part of EP-A-0 321 008 (H.B.T. Holland Biotechnology B.V., published Jun. 21, 1989) which uses hydrazine hydrate as reducing agent for $SeO_2$ and ascorbic acid for the reduction of telluric acid.

As has been indicated hereabove, the known methods for preparing sols of a non-metallic element are not completely satisfactory in that they generally result in quite turbid and/or unstable sols. Moreover, most of the known preparation methods require operation at elevated temperatures and/or involve a substantial reaction time. For example, both the gold sol preparation according to EP-A-0 007 654 and the selenium sol preparation according to EP-A-0 298 368 require at least 10 to 15 minutes at the boiling point.

The invention now overcomes said disadvantages by a process for the preparation of a sol of a metallic or a non-metallic element, comprising the step of treating a solution of a chemical compound, which contains said element in a reducible state, with a reducing agent, the process according to the invention being characterized in that a borane compound is used as the reducing agent.

It should be understood that the words "a sol of a metallic or non-metallic element" refer to a dispersion (preferably an aqueous dispersion, but alcoholic dispersions and dispersions in other organic liquids are not excluded) of particles consisting of a metal or a non-metal substantially in its elemental form. Said words do not intend to exclude that the sol particles also contain a minor amount of the metal or non-metal in the form of a chemical compound, i.e. the particles in a selenium sol may contain some selenium oxide, but most of the selenium will be present in the elemental form. Preferably at least 60%, more preferably at least 70% and most preferably substantially all of the selenium will be present in the elemental form. The same applies to sols of other elements, such as tellurium sols, gold sols, silver sols, molybdenum sols, etc.

Of course, it is inherent to the words "a sol of a metallic or non-metallic element" that the element concerned is an element which can exist in the form of a sol. Chemical elements such as hydrogen, helium, oxygen, etc. do not satisfy this inherent requirement and are consequently not covered by the word "element" as used herein. As far as metallic elements are concerned, the invention intends to cover all transition metals and rare earth metals, or all metals from the groups IB, IIB, IIIB, IVB, VB, VIB, VIIB, VIIIB, IIIA, IVA, and VA of the Periodic Chart of the elements according to The Merck Index 1983. Preferably, however, the sols of metallic elements which are prepared by the process of the invention are transition metal, noble metal and heavy metal sols, such as, in particular, gold, silver, platinum, copper, molybdenum, antimony, cobalt and nickel sols. Most preferably, the invention relates to a process for preparing a gold sol. As far as non-metallic elements are concerned, the invention is particularly concerned with sols such as selenium, tellurium, arsenic and phosphorus sols. Most preferably, the invention relates to a process for preparing a selenium sol.

As far as the borane compound is concerned, it is strongly preferred that a borane compound, selected from the group consisting of alkali metal borohydrides, alkali metal cyanoborohydrides, quaternary ammonium borohydrides and amine boranes, is used as the reducing agent. In a particularly preferred embodiment of the invention, a borane compound, selected from the group consisting of lithium borohydride ($LiBH_4$), sodium borohydride ($NaBH_4$), potassium borohydride ($KBH_4$), rubidium borohydride ($RbBH_4$), cesium borohydride ($CsBH_4$), lithium cyano borohydride ($LiBH_3CN$), sodium cyano borohydride ($NaBH_3CN$), potassium cyano borohydride ($KBH_3CN$), rubidium cyano borohydride ($RbBH_3CN$), cesium cyano borohydride ($CsBH_3CN$), ammonium borohydride ($NH_4BH_4$), tetramethylammonium borohydride [$(CH_3)_4NBH_4$], dimethylamino borane [$(CH_3)_2(NHBH_3)$], N,N-diethylaniline borane [$C_6H_5N(C_2H_5)_2.BH_3$] and pyridine borane ($C_5H_5N.BH_3$), is used as the reducing agent. It will be understood, however, that equivalent borane compounds may be used instead and that the invention is not limited to the above examples of suitable borane compounds. For example, other dialkylamino boranes than dimethylamino borane, such as diethylamino borane for example, and other amine borane complexes than N,N- diethylaniline borane and pyridine borane may be used as well.

Most preferably, however, sodium borohydride ($NaBH_4$), potassium borohydride ($KBH_4$) or pyridine borane ($C_5H_5N.BH_3$) is used as the reducing agent, as these borane compounds are easily available and have proven to give very clear and stable sols.

The present invention brings unexpected advantages over the sol preparation methods of the state of the art. A practical advantage is that the reaction takes only a few minutes at room temperature, whereas many of the prior art methods require that the reaction is carried out for at least 10 or 15 minutes at the boiling point. More significantly, the process according to the invention results in sols of much higher quality in that they are clear instead of opalescent or even turbid as most of the prior art sols, and that they have increased stability compared to sols obtained by a prior art method. For different reasons, clear sols are strongly preferred above turbid sols. The sol particles in a turbid sol usually have a more or less pronounced spongy nature, whereas the sol particles in a clear sol are more compact and more spherical in shape. As a result, the former particles contain less of the metallic or non-metallic element concerned which detracts from there visibility/discernibility (due to lower color intensity). More perfectly spherical and compact particles provide for a higher color intensity and a higher electrical charge which improves the stability of the sol. Also, a clear sol may be concentrated more easily without loss of its stability, whereas concentration of a turbid sol usually results in a decrease of the sol stability due to the occurrence of agglutination. Finally, clear sols are better suited for use in nephelometrical determinations as they cover broader ranges to distinguish clear sols and agglutinated sols.

In view of these unexpected and highly advantageous properties of sols prepared by the process of the invention, the invention also extends to sols of a metallic or a non-metallic element, which are obtained or obtainable by the process of the invention.

As is evident from the cited publications EP-A-0 007 654, EP-A-0 298 368 and NL-A-87.02769/EP-A-0 321 008, sols of metallic or non-metallic elements may be used for the labelling of a component of the reaction between a specifically-binding substance and a corresponding bindable substance. The invention extends to such a use, in particular to the use of a sol of a metallic or a non-metallic element, which is obtained or obtainable by the process according to the invention, as a label for a component of the reaction between a specifically-binding substance (such as protein, DNA, RNA, polysaccharide) and a corresponding bindable substance in a method for assaying, detecting or measuring the presence and/or quantity of a component of said reaction in a test sample.

The invention will be explained in greater detail by means of the following examples of preferred embodiments thereof. It should be noted, however, that the examples are not intended to limit the scope of the invention but merely serve to illustrate the invention.

EXAMPLE 1

0.20 g selenium oxide ($SeO_2$, Baker Chemical Company) was dissolved at room temperature in 995 ml demineralized water. The solution was constantly stirred with a magnetic bar. After stirring for 3 min, a freshly prepared solution of 0.25 g $NaBH_4$ (Chematal) in 5 ml demi water was quickly added under vigorous stirring. While releasing $H_2$, the original clear and colorless reaction mixture obtained a clear deep orange/red color after 3 min. After that time, no further increase of color was observed.

The selenium sol was purified and eventually concentrated by dialysis. The particles had a spherical shape and an average diameter of $35\pm4$ nm. The sol was stable and remained clear for several days.

EXAMPLE 2

Except for using $KBH_4$ instead of $NaBH_4$, the procedure of example 1 was repeated. As a result, an identical sol was obtained in a somewhat less violent reaction.

EXAMPLE 3

0.1 g $SeO_2$ (ICN Chemicals) was dissolved in 500 ml of demineralized water. 0.125 ml borane pyridine complex (Janssen Chimica) was added under vigorous stirring at room temperature. Within 5 min, a clear sol having a deeply orange/red color was formed. The sol was stable for at least three days before the concentration and purification by dialysis. The spherically shaped particles had an average diameter of 70 nm.

EXAMPLE 4

0.1 g $NaBH_4$-Alox (sodium borohydride on alumina, $NaBH_4$ content 10% w/w, Janssen Chimica) was added at room temperature under vigorous stirring to a solution of 0.08 g $SeO_2$ (ICN Chemicals) in 500 ml demineralized water. Immediately an orange/red sol was formed, which, after 5 min, had a stable optical density. After filtration of the Alox particles which are insoluble in water, an orange/red sol, which was stable for at least four days, remained.

EXAMPLE 5

80 mg telluric acid ($H_6TeO_6$, Merck) was dissolved in 1 liter of demineralized water. After stirring for 5 minutes at room temperature, a freshly prepared solution of 0.20 g $NaBH_4$ (Chemetal) in 2 ml demineralized water was quickly added under vigorous stirring. After 1 minute, a clear purple/brown sol was formed which was stable in optical density after 3 minutes.

The resulting stable tellurium sol was purified and eventually concentrated by dialysis.

EXAMPLE 6

A freshly prepared solution of 0.2 g $NaBH_4$ (Chemetal) in 2 ml water was added at room temperature under vigorous stirring to a solution of 0.02 g $AgNO_3$ (Merck) in 198 ml demineralized water. Immediately a dark brown sol was formed which, after a few seconds, changed into a clear yellow-green sol. This sol was stable for at least several hours; after purification by dialysis, the sol was stable for several days. The average particle size was $8\pm3$ nm.

EXAMPLE 7

0.1 g $NaBH_4$, solved in 1 ml demineralized water, was added at room temperature under vigorous stirring to a solution of 0.0115 g of chloroauric acid ($HAuCl_4$, H. Drijfhout edelmetalen) in 199 ml demineralized water. Immediately a clear dark red colored sol was formed which, after some minutes, changed into a dark red purple sol. This sol was stable before dialysis for at least 3 to 4 hours.

EXAMPLE 8

0.1 g NaBH$_4$-Alox (Janssen Chimica) was added at room temperature under vigorous stirring to a solution of 0.01 g of chloroauric acid (HAuCl$_4$, H. Drijfhout edelmetalen). After 5 min, the same amount of NaBH$_4$-Alox was added. After 10 min, the sol was filtered through a paper filter (T-10, 89 g, Schut B. V., Holland) to remove the water-insoluble Alox. The clear red to dark red sol obtained was stable for at least 3 to 4 weeks without purification by dialysis.

EXAMPLE 9

The procedure of Example 1 was repeated on different starting materials to prepare sols of copper, cobalt, nickel and molybdenum. A solution of 0.25 g NaBH$_4$ in 5 ml water was added at room temperature under vigorous stirring to 1 liter of a 0.05% solution in demineralized water of, respectively, copper sulphate, cobalt chloride, nickel chloride, and MoO$_3$. After 5 minutes, relatively stable sols had formed. The copper sol had a green color, the cobalt sol a dark brown color, the nickel sol a yellow brown color, and the molybdenum sol also a yellow brown color.

We claim:

1. A process for the preparation of a hydrosol of a non-metallic element selected from the group consisting of selenium and tellurium comprising treating an aqueous solution of a chemical compound containing said element with a reducing agent consisting of a borane compound.

2. A process according to claim 1, wherein a borane compound, selected from the group consisting of alkali metal borohydrides, alkali metal cyanoborohydrides, quaternary ammonium borohydrides and amine boranes, is used as the reducing agent.

3. A process according to claim 1, wherein a borane compound, selected from the group consisting of lithium borohydride (LiBH$_4$), sodium borohydride (NaBH$_4$), potassium borohydride (KBH$_4$), rubidium borohydride (RbBH$_4$), cesium borohydride (CsBH$_4$), lithium cyano borohydride (LiBH$_3$CN), sodium cyano borohydride (NaBH$_3$CN), potassium cyano borohydride (KBH$_3$CN), rubidium cyano borohydride (RbBH$_3$CN), cesium cyano borohydride (CsBH$_3$CN), ammonium borohydride (NH$_4$BH$_4$), tetramethylammonium borohydride [(CH$_3$)$_4$NBH$_4$], dimethylamino borane [(CH$_3$)$_2$NHBH$_3$], N,N-diethylaniline borane [C$_6$H$_5$N(C$_2$H$_5$)$_2$.BH$_3$] and pyridine borane (C$_5$H$_5$N.BH$_3$), is used as the reducing agent.

4. A process according to claim 1, whereinسodium borohydride (NaBH$_4$), potassium borohydride (KBH$_4$) or pyridine borane (C$_5$H$_5$N.BH$_3$) is used as the reducing agent.

5. A process according to claim 1, wherein a hydrosol of the element selenium (Se) is prepared.

6. A process according to claim 5, wherein selenium oxide (SeO$_2$) is used as starting material.

7. A process according to claim 1, wherein a hydrosol of the element tellurium (Te) is prepared.

8. A process according to claim 7, wherein telluric acid (H$_6$TeO$_6$) is used as starting material.

9. A hydrosol of a non-metallic element selected from the group consisting of selenium and tellurium obtained by the process of claim 1.

* * * * *